UNITED STATES PATENT OFFICE.

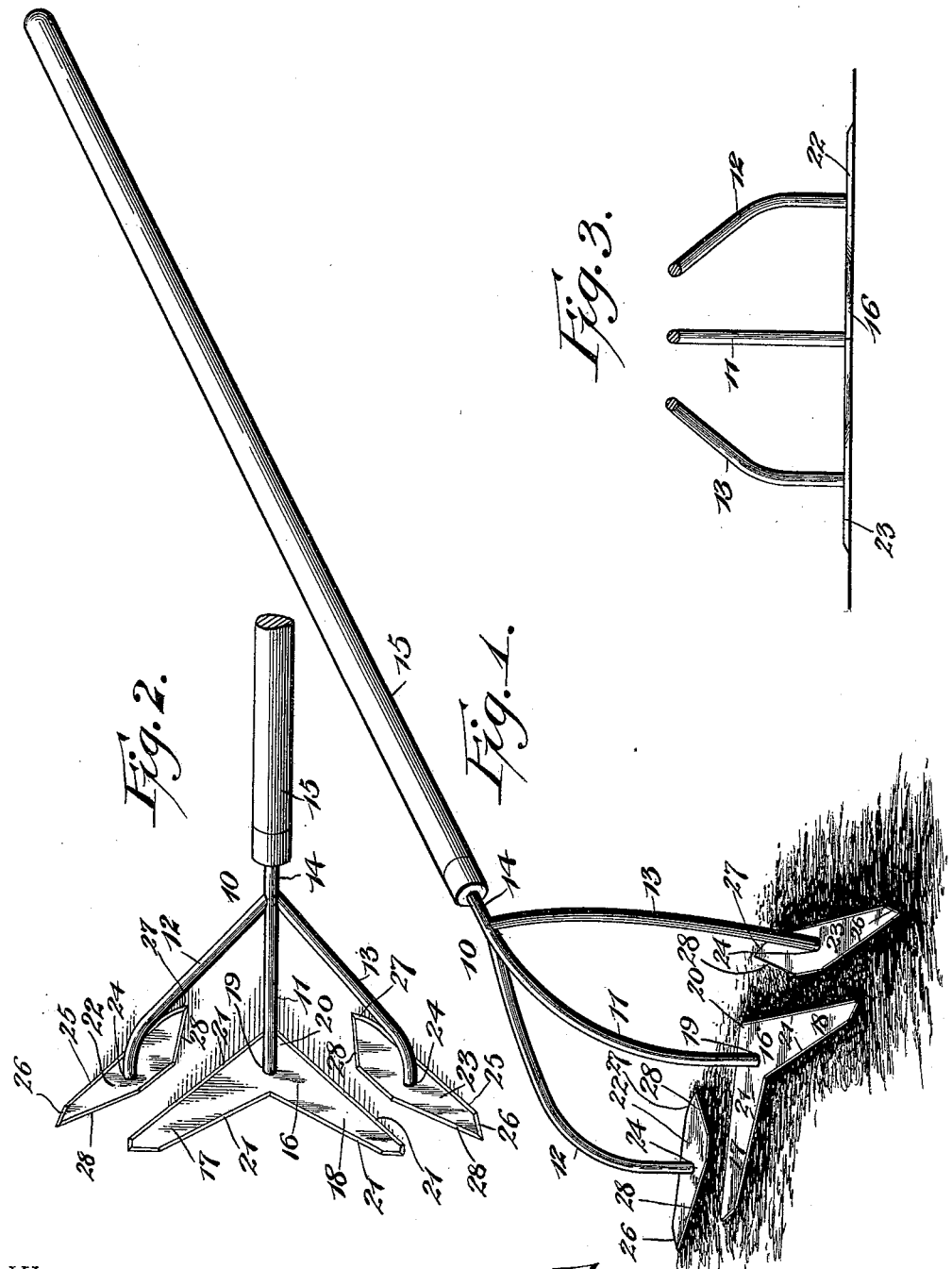

FRED D. WILLIAMS, OF COOPERSTOWN, NORTH DAKOTA.

WEEDING-HOE.

SPECIFICATION forming part of Letters Patent No. 634,158, dated October 3, 1899.

Application filed September 7, 1898. Serial No. 690,429. (No model.)

*To all whom it may concern:*

Be it known that I, FRED D. WILLIAMS, a citizen of the United States, residing at Cooperstown, in the county of Griggs and State of North Dakota, have invented a new and useful Weeding-Hoe, of which the following is a specification.

My invention relates to improvements in agricultural implements of that class known as "weeding-hoes;" and the object in view is to provide a simple and cheap construction adapted for cutting the roots of weeds below the surface of the soil without liability of choking or clogging the implement's blades with the earth, especially when used in heavy wet soil.

With this end in view the invention consists of a three-armed head or hanger, a V-shaped central blade secured to the middle arm of the hanger, and side blades fast with the lateral branches of the hanger and arranged in the horizontal plane of the V-shaped central blade to lie on opposite sides of the crown thereof and form spaces between the side and central blades.

The invention further consists in the novel construction and arrangement of parts, which will be hereinafter more fully described and claimed.

To enable others to understand the invention, I have illustrated the same in the accompanying drawings, forming a part of this specification, and in which—

Figure 1 is a perspective view of the implement. Fig. 2 is a plan view thereof. Fig. 3 is a vertical cross-section through the hanger, showing the blades in elevation.

Like numerals of reference denote like and corresponding parts in each of the several figures of the drawings.

In carrying my invention into practice I provide a three-arm head or hanger 10, which consists of a central member 11 and the branches 12 13. These branches may be integral with the central member, but, as shown by the drawings, the branches are in separate pieces from the hanger and are rigidly united thereto, as by welding the parts together. The forward extremity of the central member 11 is extended beyond the joint with the side branches to form the tang 14, adapted to be inserted in the lower end of the staff or handle 15. The central member of the hanger is arched or curved from the joint with the side members, and the lateral branches diverge in inclined positions from the opposite sides of the central member. These lateral branches are also arched or curved, and their lower rear ends lie in the same horizontal plane as the corresponding end of the central member 11, the terminals of the three members being in the same plane transversely of the implement-head.

16 is the central blade, which consists of the diverging wings 17 18, which lie at an angle to each other and give to the blade a substantially V-shaped appearance. This central blade is united rigidly in a suitable way, as at 19, to the lower extremity of the middle arched member 11 of the head, and the crown or crest 20 of this central blade lies in the median line of the implement. The blade occupies a substantially horizontal position, and each wing thereof has cutting edges 21 on its front and rear sides.

To the lateral branches 12 13 of the hanger or head are secured the side cutters 22 23, which lie in the horizontal plane of the central blade. Each side cutter is fastened or united at a point at or near its middle to the lower extremity of one of the side branches, as at 24, and the front edge of said side cutter has a cutting edge 25, the terminals of which are beveled at 26 27 on lines approaching the central cutter. Each side cutter is furthermore provided with bevels 28 on the edge thereof adjacent to the central blade, and these beveled edges are inclined to produce cutting edges which are opposed to the front cutting edges of the central blade. The side cutters are attached to the lateral branches of the head to lie on opposite sides of the crest or apex of the V-shaped central blade; but the rear edges 28 of the side cutters are spaced with relation to the front edges of the central cutter, so as to leave openings or spaces between the inclined wings of the central cutter and the two side cutters. These side cutters serve to sever preliminarily the roots which lie in their path, and in the operation of the implement any roots which remain uncut by the side cutters are severed by the wings of the central cutter. By spacing the side cutters on opposite sides of the crest of the V-shaped cutter the implement is adapted to cut all the roots which may lie in the path of the blades, and the crest of the central cutter is thus adapted to operate in the space between the side cutters, thus giving to the blades of the implement maximum efficiency. The bevels on the front and rear edges of the side cutters produce points at the extremities of said cutters, and these pointed ends enable the cutters to readily penetrate the soil.

My implement has its blades provided with beveled cutting edges at the front and rear sides thereof, and these blades are thus brought into service on the forward and backward movement of the implement. As a rule the implement is operated by drawing it toward the operator; but in cutting between rows of plants the operator sometimes works the implement back and forth in order to loosen the soil around the roots of the plants. Under this condition and operation of the implement the cutting edges at front and rear of the blades are of special utility, inasmuch as said edges sever the roots of weeds and the like on each stroke or movement of the implement, whether it be in a forward or backward direction. It will be observed that each of the blades lies in a position oblique to the line of the stroke or movement, and the working edges of the said blade operate to sever the roots with a draw or shear cut.

My implement has its blades arranged to penetrate the soil and cut the roots of weeds below the surface of the earth, thus leaving the soil in a loosened condition around the plants for the free penetration of moisture to the roots of such plants.

The implement is simple in construction, and it may be manufactured and sold at a low price. It is efficient in operation, and its blades are arranged for the operator to have ready access to the cutting edges for sharpening the same.

Changes may be made in the form of some of the parts, while their essential features are retained and the spirit of the invention embodied. Hence I do not desire to be limited to the precise form of all the parts as shown, reserving the right to vary therefrom.

Having thus described the invention, what I claim is—

1. A weeding-hoe consisting of a staff, a three-armed hanger fastened to the staff, a middle blade fastened to one hanger-arm to lie at an angle to the axis of the staff and having the double inclined cutting edge, and the side blades fastened to the other hanger-arms and lying in the same plane with the middle blade, said side blades being arranged in front of the middle blade, on opposite sides of the apex thereof, and each having the cutting edges at its front and rear edges, substantially as and for the purpose described.

2. A weeding-hoe consisting of a staff, a three-armed hanger fastened thereto and having the terminal of its middle arm at one side of the straight line joining the terminals of its outer arms, a middle V-shaped blade fastened to the central hanger-arm to lie at an angle to the axis of said staff and having the cutting edges on its front and rear edges and the double-edged side blades attached to the side hanger-arms to lie in the same plane with the middle blade and arranged in advance, and on opposite sides of, said middle blade to leave the intervening throats or spaces between the cutting edges of said blades, the inner ends of the side cutters being in advance of the outer ends of the V-shaped middle blade, substantially as described.

3. A weeding-hoe consisting of a staff, a three-armed hanger fastened thereto, a V-shaped middle blade secured to the central hanger-arm and having the inclined cutting edges at the front and rear thereof, and the double-edged side cutters fastened to the side hanger-arms to lie in the plane with, and in advance of, the middle blade to form the intervening throats or spaces between the cutting edges of said blades, the inner end of each side blade having the beveled edge, 28, and situated in a plane between the apex and one end of said middle blade, substantially as described.

In testimony that I claim the foregoing as my own I have hereto affixed my signature in the presence of two witnesses.

FRED D. WILLIAMS.

Witnesses:
M. W. BUCK,
P. R. FURBSHAW.